Figure 1:
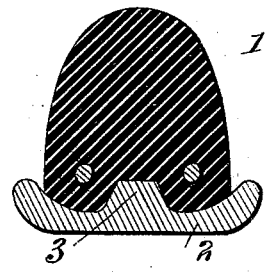

No. 665,898. Patented Jan. 15, 1901.
W. R. GIDDEON.
RUBBER TIRE FOR VEHICLES.
(Application filed Sept. 8, 1900.)
(No Model.)

Witnesses
Charles K. Davies.
W. B. Nkham.

Inventor
William Reese Giddeon
by J. T. Cameron
his Attorney

UNITED STATES PATENT OFFICE.

WILLIAM REESE GIDDEON, OF KNOXVILLE, TENNESSEE.

RUBBER TIRE FOR VEHICLES.

SPECIFICATION forming part of Letters Patent No. 665,898, dated January 15, 1901.

Application filed September 8, 1900. Serial No. 29,442. (No model.)

*To all whom it may concern:*

Be it known that I, WILLIAM REESE GIDDEON, a resident of Knoxville, Tennessee, have invented a new and useful Improvement in Rubber Tires for Vehicles, which invention is fully set forth in the following specification.

My invention relates to vehicle-tires, and more especially to solid rubber tires and the manner of securing the same to the tire-rims.

In most all the solid-rubber-tired vehicles now in use it has been found necessary to make some effectual provision against the side chafing and wear of the rubber tire. This has been heretofore secured by setting the rubber tire in a deeply-channeled metal rim, which protects the sides of the tire by its upwardly-projecting metal walls. While this side chafing has been practically neutralized by such means, the undue or tearing strain upon the tire-retaining holes or grooves has always remained. This tearing strain upon the tire-retaining openings, or "wire-holes," as they are commonly called, (wire being generally used for fastening solid rubber tires,) is due in most instances to the use of the deeply-channeled rim. In such constructions the tire is jammed into the channel-rim to such a degree that when the load of the vehicle is brought to bear upon the tire there is a constant wearing and tearing strain upon the wire-holes, for the reason that the pressure crowds the rubber next to the wire-holes against the flanges of the channeled rim on both sides. In my invention I provide for these transverse strains upon the wire-holes by allowing a limited expansion of the rubber from a central longitudinal portion of the tire outwardly in both directions, and yet within certain defined limits, which results in neutralizing the wear and tear upon the wire-holes—the weakest portions of the tire. This result is produced by providing the rim with a central longitudinal projection or depression, and from this central portion the rim is dished at each side to the outer edge. This dished shape is preferably formed by oppositely upwardly projecting curved or concaved surfaces terminating in projecting edges extending beyond the sides of the tire. On the base of the rubber tire is a central longitudinal depression or projection engaging the corresponding projection or depression in the rim, while the balance of the base of the tire is formed in such manner that in assembling the parts the sides of the base are brought into contact with the outer edges of the rim and also generally at intermediate points in the rim in advance of the contact with the corresponding depression and projection of the rim and tire. When the retaining-wires are thereafter brought under tension, the outer sides of the tire are brought under greater tension than the more central portions, thereby effectually sealing the exposed sides of the tire against the introduction of dirt and other extraneous matter tending to disrupt or distort the tire.

With these objects in view my invention consists in the following construction and combination of parts, the features of novelty of which are set forth in the appended claims.

Figure 2:
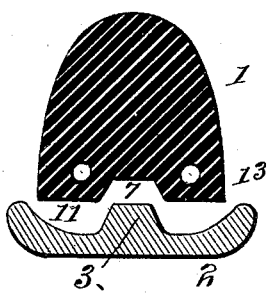
Figure 3:
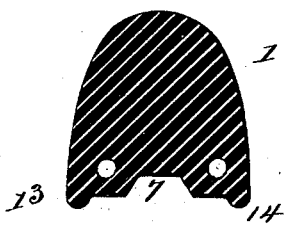
Figure 4:
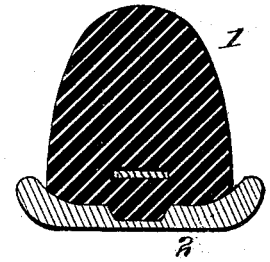
Figure 5:
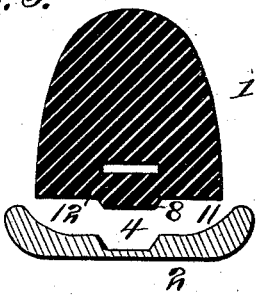
Figure 6:
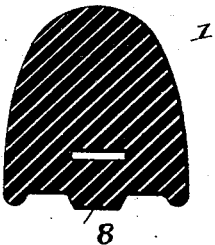
Figure 7:
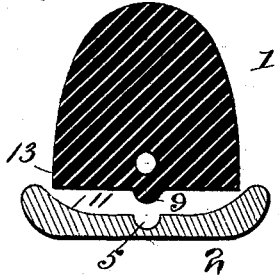
Figure 8:
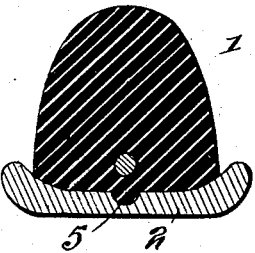

Figure 1 is a transverse section of a tire and rim to which my improvements have been applied, and Fig. 2 is a similar view showing the tire and rim detached. Fig. 3 is a transverse section of a modified form of tire. Fig. 4 is a cross-section of another modification of tire and rim, and Fig. 5 the same parts detached. Fig. 6 is a sectional view of another modified form of tire. Figs. 7, 8, 9, and 10 illustrate in cross-sectional views still other modifications.

In the drawings, 1 represents the solid rubber tire throughout the figures, and 2 the rim. The rim 2 is attached to the felly or spokes of a wheel in any approved way.

The rim 2 is either provided with a central longitudinal projection or depression in all the modifications. In Figs. 1 and 2 an angular projection 3 is shown, in Figs. 4 and 5 an angular depression 4, in Figs. 7 and 8 a curved depression 5, and in Fig. 10 a curved projection 6.

The tire 1 is correspondingly provided with a central angular or curved depression or projection adapted to fit the rim. On Figs. 1, 2, and 3 this conformation is shown at 7, in Figs. 4, 5, and 6 it is shown at 8, in Figs. 7, 8, and 9 at 9, and in Fig. 10 at 10.

11 is the curved or concaved dish of the rim at either side of the depression or projection. The shape of the base 12 of the tire is such with relation to the dished rim that the outer edges or sides 13 of the base of the tire first come in contact with rim 2 and are brought under greater tension than the other portions of the base, thereby sealing the sides of the tire and rim against dismemberment or the entrance of dirt or moisture.

Figure 9:
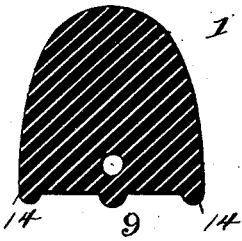
Figure 10:
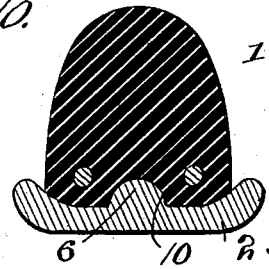

In Figs. 3, 6, and 9 the base edges of the tire are provided with lips or beads in order to give a still greater quantity of rubber in forming the hermetic seal between the rim and the base edges of the tire.

The various figures in the drawings merely illustrate some of the shapes in which the irregular-formed central longitudinal depressions or projections in the tire and rim may be fashioned. In like manner the base-lines of the tire have been given some exemplifications in their relation to the dish-shaped rim. So, also, the two-wire, one-wire, and band or tape retaining means for securing the tire to the rim have been illustrated.

What I claim is—

1. The combination of a rim and a tire having corresponding central longitudinal interlocking means, said rim being provided with a dished face gradually flaring from the base to a point beyond the opposite sides of the tire, and said tire having fastening means for securing it to the rim.

2. The combination of a rim and a tire having corresponding depressions and projections, said rim having a dished face gradually flaring from the base to a point beyond the opposite sides of the tire and said tire being provided with fastening means.

3. The combination of a metal rim having a dished or concave outer surface in transverse section gradually flaring from the base to a point beyond the opposite sides of the tire, with a solid rubber tire so secured to said rim as to leave the side walls of the tire free from contact with the rim.

4. The combination of a metal rim with a dished or concave outer surface in transverse section gradually flaring from the base to a point beyond the opposite sides of the tire with a solid rubber tire so secured to the rim as to leave the side walls of the tire free from contact with the rim and place the greatest compression of the rubber along its outer bottom edges.

In testimony whereof I have signed this specification in the presence of two subscribing witnesses.

WILLIAM REESE GIDDEON.

Witnesses:
R. W. WILLIAMS,
C. T. WILLIAMS.